(12) United States Patent
Park et al.

(10) Patent No.: US 7,135,543 B2
(45) Date of Patent: Nov. 14, 2006

(54) POLYAMIC ESTER HAVING MOIETIES OF ELECTRO OPTIC AND NONLINEAR OPTICAL COMPOUND IN SIDE CHAINS AS AN ELECTRO OPTIC AND NONLINEAR OPTICAL POLYMER, MANUFACTURING METHOD THEREFOR AND FILM MANUFACTURED THEREFROM

(75) Inventors: Seung Koo Park, Daejon-Shi (KR); Jung Yun Do, Daejon-Shi (KR); Jung Jin Ju, Daejon-Shi (KR); Suntak Park, Daejon-Shi (KR); Min-Su Kim, Daejon-Shi (KR); Myung-Hyun Lee, Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 95 days.

(21) Appl. No.: 10/740,591

(22) Filed: Dec. 22, 2003

(65) Prior Publication Data

US 2004/0220379 A1    Nov. 4, 2004

(30) Foreign Application Priority Data

May 2, 2003    (KR) ............... 10-2003-0028187

(51) Int. Cl.
    C08G 69/00    (2006.01)
    C08G 69/26    (2006.01)
    C08G 69/28    (2006.01)
(52) U.S. Cl. ............... 528/353; 528/288; 528/358; 528/358.3; 528/486
(58) Field of Classification Search ............... 528/353, 528/258, 358, 358.3, 486
    See application file for complete search history.

(56) References Cited

U.S. PATENT DOCUMENTS

| 5,399,664 | A |   | 3/1995  | Peng et al. |         |
|-----------|---|---|---------|-------------|---------|
| 5,688,906 | A |   | 11/1997 | Jen et al.  |         |
| 5,736,592 | A |   | 4/1998  | DeMeuse et al. |      |
| 5,952,448 | A | * | 9/1999  | Lee et al.  | 528/170 |
| 6,828,409 | B1 | * | 12/2004 | Park et al. | 528/170 |

OTHER PUBLICATIONS

Park et al, New host guest polymeric system for thermal stability. Enhancement of electrooptic effect, 2002, Materials research society, Journal, Chem Abstract 138: 188457.*

K. Kim, et al.; "*Thermal imidization behavior of aromatic poly (amic dialkyl ester) precursors derived from biphenyltetracarboxylic dianhydride*"; Polymer Bulletin 34; 1995; pp. 219-226.

(Continued)

*Primary Examiner*—Duc Truong
(74) *Attorney, Agent, or Firm*—Mayer, Brown, Rowe & Maw LLP (57) ABSTRACT

The invention relates to a polymer material having electro optic and nonlinear optical properties suitable for manufacturing a device using the electro optic and nonlinear optical properties. More particularly, the present invention relates to a polymer material having excellent electro optic properties and optical nonlinearities, maintaining the properties under the manufacturing conditions of high temperature, and having physical, chemical, and optical stabilities by introducing an organic chromophore as a side chain of the polymer so that the polymer material can be suitable for manufacturing an electro optic and nonlinear optical device, to a film manufactured from the polymer material, and to a method of manufacturing the polymer material.

21 Claims, 2 Drawing Sheets

OTHER PUBLICATIONS

Tian-An Chen, et al.; "*Two-Step Synthesis of Side-Chain Aromatic Polymides for Second-Order Nonlinear Optics*"; Macromolecules 1996, 29; pp. 535-539.

Dong, Yu, et al.; "*Novel Aromatic Polyimides for Nonlinear Optics*"; J. Am. chem. Soc. 1995, 117; pp. 11680-11686.

Park et al.; "New Host-Guest Polymeric System For Thermal Stability Enhancement Of Electro Optic Effect"; Materials Research Society; 2002; pp. 1-6.

* cited by examiner

POLYAMIC ESTER HAVING MOIETIES OF ELECTRO OPTIC AND NONLINEAR OPTICAL COMPOUND IN SIDE CHAINS AS AN ELECTRO OPTIC AND NONLINEAR OPTICAL POLYMER, MANUFACTURING METHOD THEREFOR AND FILM MANUFACTURED THEREFROM

BACKGROUND OF THE INVENTION

1. Field of the Invention

The invention relates to a polymer material having electro optic (EO) and nonlinear optical (NLO) properties suitable for manufacturing a device using EO and NLO properties. More particularly, the present invention relates to a polymer material having excellent EO properties and optical nonlinearities, maintaining the properties under the manufacturing conditions of high temperature, and having physical, chemical, and optical stabilities by introducing an organic chromophore as a side chain of the polymer so that the polymer material can be suitable for manufacturing an EO and NLO device, to a film manufactured from the polymer material, and to a method of manufacturing the polymer material.

2. Description of the Prior Art

Recently, as the optical devices for high speed and capacity data transmission have been rapidly developed, the demand for materials having EO and NLO properties suitable for that field has been rapidly increased and the associated research has been actively performed. Currently, inorganic crystal materials such as $LiNbO_3$ and InGaAsP are used as materials of optical devices for optical communication suitable for high speed signal processing. These inorganic crystals have stable, high optical nonlinearity. However, every step of synthesizing the inorganic crystals is complicated and time consuming, which is increasing the manufacturing cost of the inorganic crystals.

On the other hand, many organic materials, particularly, polymer materials having EO and NLO properties have been developed for 20 years. The organic materials have advantages in their synthesis and producing processes in comparison to those of the aforementioned inorganic materials. Additionally, it is possible to control their properties such as production temperatures, refractive indexes, optical coefficients, and absorption wavelengths, etc., according to various requirements. These organic polymer materials having EO and NLO properties have prepared by reaction between the organic chromophores and polymers. The organic chromophores have conjugate linkages in their molecular structures for electron mobility and dipoles that are highly responsive to an external electric field due to the introduction of electron donating and electron accepting groups. The chromphores in a polymer matrix are aligned one directionally by applying an electric field, which is so called "poling".

The efficiency of the poling is high at around the glass transition temperature (Tg) at which the molecular movement of the polymers is highly activated. A practical device process, particularly in electrode patterning, is generally carried out around 80–100° C. If $T_g$<150° C., there is an easy relaxation of the poled chromophores during the fabrication process. If $T_g$>200° C., it is very difficult to pole chromophores with very strong field at a temperature above 200° C. without dielectric breakdown. (M-H. Lee et al., "Polymeric Electro optic 2×2 Switch Consisting of Bifurcation Optical Active Waveguides and a Mach-Zehnder Interferometer", *IEEE J. on Selected Topics in Quantum Electronics*, 7, 812, 2001). Therefore, it is preferable that the Tg of the polymer system for the EO and NLO devices is in the range of 150~200° C.

Organic optical polymers are mainly classified into a host-guest polymer system, a side chain polymer system, a main chain polymer system, and a crosslinked polymer system (G. A. Lindsay, "Second-Order Nonlinear optical Polymers: An Overview", *ACS Symp. Ser.* 60, G. A. Lindsay and K. D. Singer eds., ACS, 1995, chap. 1).

First of the types, the host-guest polymer system can be obtained by mixing an organic chromophore with a polymer matrix. The method is the simplest process. If the organic chromophore is well dispersed in the polymer matrix, the poling effect can be maximized due to increase in freedom of molecular motion of the organic chromophore. However, its optical nonlinearity is greatly reduced in the manufacture of optical devices at a high temperature due to its free molecular movement. And, as the amount of organic dye increases, the glass transition temperature (Tg) of the polymer system decreases, and light scattering occurs due to an agglomeration of organic chromophore molecules, resulting in optical loss. Secondly, the side chain polymer system is developed in order to solve the problems of the host-guest polymer system. In the side chain polymer system, an organic chromophore is chemically bound to a polymer to avoid the agglomeration of the organic chromophore and to provide the resulting polymer system with an appropriate Tg for the high stability of the optical nonlinearity. The side chain type polymer system can be obtained by introducing the organic chromophore into a side chain of the polymer.

Thirdly, the main chain polymer system can be obtained by incorporation of a nonlinear optical organic chromophore into a polymer main chain. As can be expected from this structure, the main-chain polymer system has lower molecular mobility than the side-chain polymer system and provides poor poling effect, but its optical non-linearity is thermally stable.

Finally, the crosslinked polymer system is used to improve the thermal stabilities of the host-guest polymer system and the side chain polymer system with low Tg. Specifically, in order to improve the thermal stability of the optical nonlinearity of the NLO polymer after poling, the main chains of the polymer or the chromophores are crosslinked after the poling. By crosslinking reaction between the main chains of the polymer or between the chromophores, the movement of the organic chromophores is reduced so that the high optical nonlinearity can be maintained even at a high temperature. In general, the polymer main chain is thermo or photo cross-linked in the presence of a catalyst. However, after the cross-linking reaction, the unreacted cross-linkers or catalyst remain, which limits use of the cross-linked polymer system for optical devices (see U.S. Pat. No. 5,420,172 and U.S. Pat. No. 5,776,374).

Among the four types of polymer systems, the side chain type polymer system is known to be most suitable for the optical device in terms of the poling effect and the thermal stability of the optical nonlinearity. Especially, high $T_g$s of aromatic polyimides (PIs) have attracted attention due to stability in the aligned dipole orientation in the fields of EO and NLO polymers. In this case, since the PIs repeating unit has at least one functional group such as hydroxyl group and carboxyl acid group, the side chain EO and NLO PIs can be easily prepared from a reaction between the functional groups of the PIs and the organic ghromophores via the Mitsunobu reaction (O. Mitsunobu, "The Use of Diethyl Azodicarboxylate and Triphenylphosphine in Synthesis and Transformation of Natural Products", *Synthesis*, 1, 1, 1981). (T-A. Chen et al., "Two-Step Synthesis of Side-Chain Aromatic Polyimides for Second-order Nonlinear optical", *Macromolecules*, 29, 535, 1996; H.-J. Lee et al., "Synthesis and properties of nonlinear optical side chain soluble polyimides for photonics applications", *Journal of Polymer Science: Polymer Chemistry Edition* 36, 301, 1998; E.-H. Kim et al, "Synthesis and characterization of novel polyimide-based NLO materials from poly(hydroxy-imide)s containing alicyclic units (II)", *Polymer*, 40, 6157, 1999.; W. N. Leng et al., "Synthesis of nonlinear optical side-chain soluble polyimides for electro-optic applications," *Polymer*, 42, 7749, 2001). This procedure is simple and reliable for the preparation of the side-chain EO PIs. In this reaction, however, the PI repeating unit must have at least one functional group such as a hydroxyl or a carboxyl acid group for the preparation of the side-chain EO PIs. The chemical structures of monomers for the preparation of the side-chain EO PI via the polymer reaction is limited for this reason.

Even though diamine monomers containing various EO chromophores have been recently developed for the preparation of the side-chain EO PIs, the preparation of the monomers is not easy and the purification process is needed for obtaining a high degree of polymerization (D. Yu et al., "Novel Aromatic Polyimides for Nonlinear optical", *Journal of The American Chemical Society*, 117, 11680, 1995; U.S. Pat. No. 5,399,664). A tricyanovinyl group can be introduced into PIs with a specific chemical structure via tricyanovinylation for preparing EO and NLO PIs. In this case, the PIs chemical structure is also limited as in the Mitsunobu reaction (U.S. Pat. No. 5,688,906).

SUMMARY OF THE INVENTION

The present invention is intended to solve the above problems and an object of the present invention is to provide a novel side chain electro optic (EO) or nonlinear optical (NLO) polymer of polyamic ester form.

Another object of the present invention is to provide a method of manufacturing a novel side chain EO or NLO polyamic ester using a polyamic acid (PAA), a polyimide (PI) precursor.

Still another object of the present invention is to provide a film which is made of a novel side chain EO or NLO polyamic ester.

The novel side chain EO or NLO polyamic ester in accordance with the first object of the present invention can be depicted by the following chemical formula 1.

[Chemical Formula 1]

In the chemical formula 1, ■ denotes an aliphatic or an aromatic moiety, ● denotes an aromatic moiety, and D is a residual group of an organic chromophore having EO or NLO properties.

In the chemical formula 1, D denotes a residual group of a π-conjugated organic chromophore, and more specifically, a residual group of an organic chromophore having both an electron donating group and an electron accepting group.

The preferred organic chromophores include, for example, 2-{ethyl-[4-(4-nitro-phenylazo)-phenyl]-amino}-ethanol (DR1), 2-{[4-(2-chloro-4-nitro-phenylazo)-phenyl]-ethyl-ethyl amino}-ethanol (DR13), 2-(methyl-{4-[2-(4-nitro-phenyl)-vinyl]-phenyl}-amino)-ethanol, and 2-cyano-3-{4-[(2-hydroxy-ethyl)-methyl-amino]-phenyl}-but-2-en dinitrile. These molecules have molecular structures represented by the following Chemical Formulas 2 to 5, respectively.

[Chemical Formula 2]

[Chemical Formula 3]

Chemical Formula 4]

[Chemical Formula 5]

Since the chemical bonding of organic chromatic molecule to main chain of polymer is stable and the corresponding EO polyamic ester is also very stable, the change of various characteristics due to the thermal, electro, and photonic influences is so small that the polyamic ester can satisfy the requirements as the materials of the optical devices. In addition, the side chain polyamic ester according to the present invention shows a superior EO coefficient. The EO polyamic esters are very excellent in comparison to the conventional EO polyimides when poling under the same condition.

The novel side chain EO or NLO polyamic ester in accordance with the present invention may be a polymer having the structure represented by the chemical formula 1 or a copolymer with another type of monomers.

The novel side chain EO or NLO polyamic ester in accordance with the present invention may be of a linear or a branched type.

The number average molecular weight of the polymer in accordance with the present invention is in the preferable range of 5,000~50,000 g/mol although it may be varied according to the glass transition temperature (Tg), the thermal stability, or other requisite properties.

In the case that the polymer in accordance with the present invention is a copolymer, the arrangement between the heterogeneous monomers may be any types of arrangements. For example, the copolymer may have one of arrangements of a random copolymer, an alternating copolymer, a block copolymer, a graft copolymer, or other monomer arrangements.

The typical example of the novel side chain EO or NLO polyamic ester in accordance with the first object of the present invention is the 6F-ODPA DR1 polyamic ester is represented by the following chemical formula 6.

[Chemical Formula 6]

The method of manufacturing of the novel side chain EO or NLO polyamic ester in accordance with the second object of the present invention comprises steps of i) preparing a polyamic acid by reacting a diamine monomer with an aromatic dianhydride; and ii) forming the polyamic ester by reacting the polyamic acid with an organic chromophore, wherein the organic chromophore comprises a functional group such as a hydroxyl group and a carboxyl group, and has EO or NLO properties.

As in the aforementioned method, a polyamic acid is prepared from the reaction between a diamine and a dianhydride in a aprotic solvent. The polymerization reaction is represented by the following equation 1.

[Equation 1]

■ aliphatic or aromatic

● aromatic

Although any types of aliphatic or aromatic diamines may be used in the aforementioned reaction, the diamine preferably includes 2,2-bis(4-aminophenyl)hexafluoropropane, 4,4'-diaminooctafluorobiphenyl, oxydianiline, p-phenylene diamine, 1,3-diaminopropane, and more preferably includes 2,2-bis(4-aminophenyl)hexafluoropropane in consideration of the Tg of the obtained polymer.

Although any types of aromatic dianhydrides may be used in the aforementioned reaction, the dianhydride preferably includes 4,4'-oxydiphthalic anhydride (ODPA), 4,4'-(hexafluoroisopropylidene)diphthalic anhydride, benzophenone tetracarboxylic dianhydride, biphenyl tetracarboxylic dianhydride, pyromellitic dianhydride and more preferably includes 4,4'-oxydiphthalic anhydride in consideration of solubility of the obtained polymer.

The solvent suitable for the polymerization is a solvent that dissolves the monomers and the resulting polymer without any side effects during polymerization. The solvent includes anhydrous dimethylacetamide (DMAc), dimethylformamide (DMF), methylpyrrolidone (NMP), etc. Among them, DMAc and NMP are particularly preferable.

It is preferable that the solution concentration is in the range of 15 to 25 wt %.

The polymerization can be performed within the range 0 to 50° C., preferably 5° C. to the room temperature.

The polymerization reaction is preferably performed under an inert atmosphere, for example, under the nitrogen gas atmosphere in order to remove the effect of moisture in the air during polymerization.

The polyamic acid obtained by polymerization may be purified with suitable purification methods well known in the organic chemistry. For example, after the polymer is completely dissolved in a suitable solvent, the polymer solution is added into an appropriate nonsolvent for precipitation. Furthermore, if necessary, the steps for purification may be repeated.

In the second step in accordance with the second object of the present invention, the novel side chain EO or NLO polymer of polyamic ester is prepared from the reaction between the polyamide acid and the organic chromophore in the presence of the catalysts of diethyl azodicarboxylate (DEAD) and triphenyl phosphine (TPP) in a suitable solution. The esterification reaction between of the polyamic acid and the organic chromophore is represented by the following equation 2.

[Equation 2]

In the above equation, D in HO-D indicating the organic chromophore is the same as defined above. The hydroxyl group can react with the carboxyl acid group of the polyamide acid in the esterification reaction. Examples of the organic chromophore are the same as illustrated above.

Since the carboxyl acid group of the polyamic acid and the hydroxyl group of the organic chromophore are reacted equivalently, the slightly high feeding ratio of the organic chromophore (about 1.05 to 1.1 mole of the organic chromophore per one mole of the carboxyl acid group) is preferable.

An appropriate solvent used for the esterification reaction may be any solvent causing no side reaction and dissolving the reactants. The solvent includes tetrahydrofurane (THF), methylenechloride, and DMF, and among them, the THF is particularly suitable.

It is preferable that the solution concentration is in the range of 10 to 15 wt %.

One of the catalysts used in the esterification reaction is a combination of triphenyl phosphine and diethyl azodicarboxylate.

The reaction may be performed at the room temperature.

The polymer reaction is performed under an inert atmosphere, for example, under the nitrogen gas atmosphere in order to remove the effect of moisture in the air.

The polyamic ester obtained by the polymer reaction may be purified with suitable purification methods well known in the organic chemistry. For example, after the polymer is completely dissolved in a suitable solvent, the polymer solution is added into an appropriate nonsolvent for precipitation. Furthermore, if necessary, the steps for purification may be repeated.

The film of a side chain EO and NLO polyamic ester in accordance with the third object of the present invention may be prepared with a spinning coating method or other suitable methods after the polymer being dissolved in an appropriate solvent. For example, the solution was spin coated on an indium tin oxide (ITO) glass. The film was dried completely. The alignment of the chromophore in the film was achieved by an electrode contact poling method. A gold electrode was prepared on the top of the polymer film on the ITO glass by thermal vacuum evaporation. While the film was at room temperature, a positive voltage was applied to the top of the electrode and the ITO glass was grounded. The film was then heated to near Tg of the polymer and held for several minute. The film was then allowed to cool to room temperature with the voltage still applied.

The solvent for the polymer may be any solvent neither changing the properties of the polymer nor causing a side effect on the polymer by its reaction with the polymer. An appropriate solvent includes cyclopropanone, cyclohexanone, and γ-butyrolactone. The polymer solution concentration is 10 to 20 wt %, and preferably about 15 wt %.

The poling temperature is preferable to be around Tg of the polymer, for example, within the range from 150° C. to 200° C.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

The present invention will be described in detail by way of a preferred embodiment with reference to accompanying drawings, in which like reference numerals are used to identify the same or similar parts.

Now, the reaction processes of the first and second embodiments are schematically represented by the following equation 3. In the embodiments, a polyamic acid which is synthesized from 2,2-bis (4-aminophenyl) hexafluoropropane (6F) and 4,4'-oxydiphthalic anhydride (ODPA) is used as a polymer main chain, and a commercial DR1 (Disperse Red 1) is used for an organic chromophore.

6F-ODPA-DR1 polyamide acid ester (PAF)

First Embodiment

Synthesis of Polyamic Acid 3.0 g of 2,2-bis (4-aminophenyl) hexafluoropropane (6F) purified under reduced pressure at 220° C. was charged into 100 ml 2-neck flask equipped stirrer, then the 6F was completely dissolved in 23 ml of anhydrous dimethylacetamide (DMAC) under nitrogen.

2.8 g of 4.4'-oxydiphthalic anhydride (ODPA) was introduced all at once into the solution with vigorous stirring 24 hours after the reaction, the resulting clear polymer solution was diluted to 10% by anhydrous dimethylacetamide, thereafter, the solution was poured into mixed solvent of methanol/water (8/2, v/v). The polymer mass was redissolved into tetrahydrofuran (THF) and the resulting solution was added dropwise into mixed solvent of methanol/water (8/2, v/v) for purification. For more purification, these steps were repeated several times.

The white precipitate was dried under vacuum at 60° C. 4.2 g (yield 72%) of polyamic was obtained.

Figure 1A:
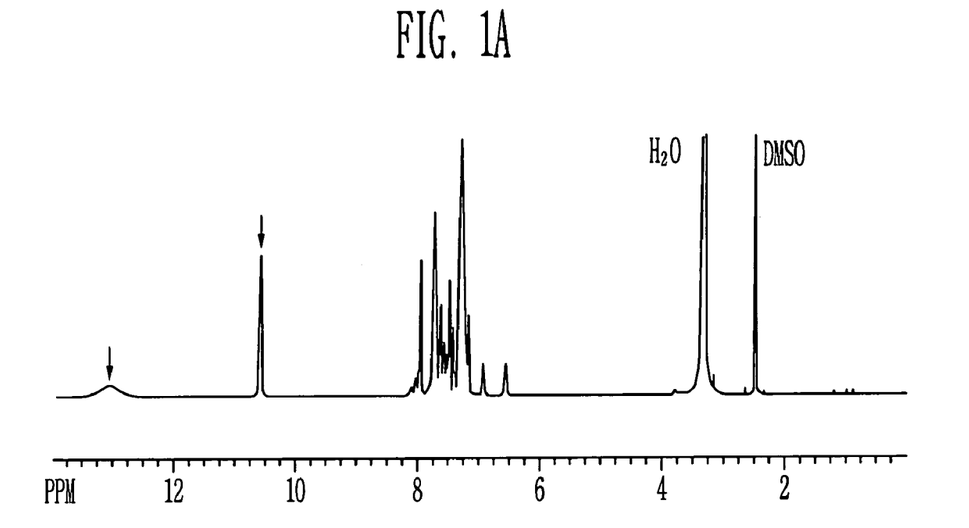
FIG. 1 is nuclear magnetic resonance spectra ($^1$H-NMR) of polyamic acid (A) and polyamic ester (B) which are synthesized in the first and second embodiments according to the present invention.

The $^1$H-NMR spectrum of the compound was represented in FIG. 1A.

Second Embodiment

Preparation of Electro Optic and Nonlinear Optical Polyamic Ester

After 1.0 g of polyamic acid obtained in the first embodiment and 1.1 g of DR1 were introduced into 50 mL 2-neck flask and dissolved in 19 mL of anhydrous tetrahydrofuran (THF) in nitrogen with stirring, 0.94 g of triphenyl phosphine (TPP) was added. After that, 0.56 mL of diethyl azodicarboxylate (DEAD) was slowly dropped. The reaction proceeds at room temperature for 24 hours. After the completion of the reaction, the red polymer solution was added dropwise into methanol for precipitation. The obtained polymer mass was dissolved in THF again and reprecipated into methanol for purification. This procedure was repeated several times for more purification. To remove completely the unreacted dyes and additives, the red polymer powder was applied to a Soxhlet extractor with methanol for 24 h.

Figure 1B:
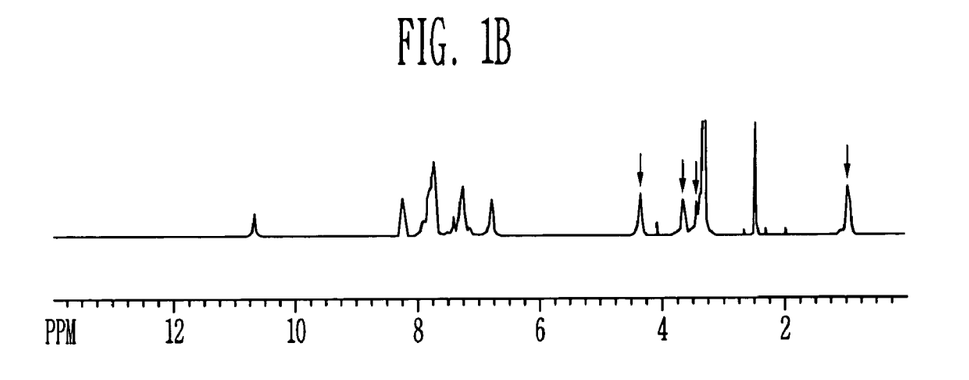

The red powder is dried under vacuum at 60° C. 1.6 g of EO or NLO polyamic ester was obtained (yield: 76%). $^1$H-NMR of the polyamic ester is shown in FIG. 1B.

The glass transition temperature of the polymer was around 172° C.

Third Embodiment

Evaluation of EO or NLO Polyamic Ester

The 0.4 g of the optical polyamic ester obtained in the second embodiment was dissolved in 1.7 mL of cyclopentanone. The solution concentration was adjusted to 15% (w/w). After the solution was filtered with a 0.2 μm Teflon filter, the solution was spin-coated on an indium tin oxide (ITO) glass at 800 rpm for 30 sec. The film was dried at 80° C. under vacuum for 48 h. The film thickness was about 1 μm. The alignment of the chromophore in the film was achieved by an electrode contact poling method. 0.1 mm thickness of gold electrode was prepared on top of the polymer film on the ITO glass by thermal vacuum evaporation. While the film was at room temperature, a positive voltage (50–150V/μm) was applied to the top of the electrode and the ITO glass was grounded. The film was then heated to near Tg (150° C.) of the polymer and held for 5 min. The film was then allowed to cool to room temperature with the voltage still applied.

Optical properties of the films were measured.

The electro optic coefficients ($r_{33}$) were measured at a wavelength of 1550 nm using a simple reflection method proposed by Teng et al. (C. C. Teng and H. T. Mann, *Appl. Phys. Lett.*, 56, 1734, 1990), and the results are plotted in FIG. 2.

Figure 2:
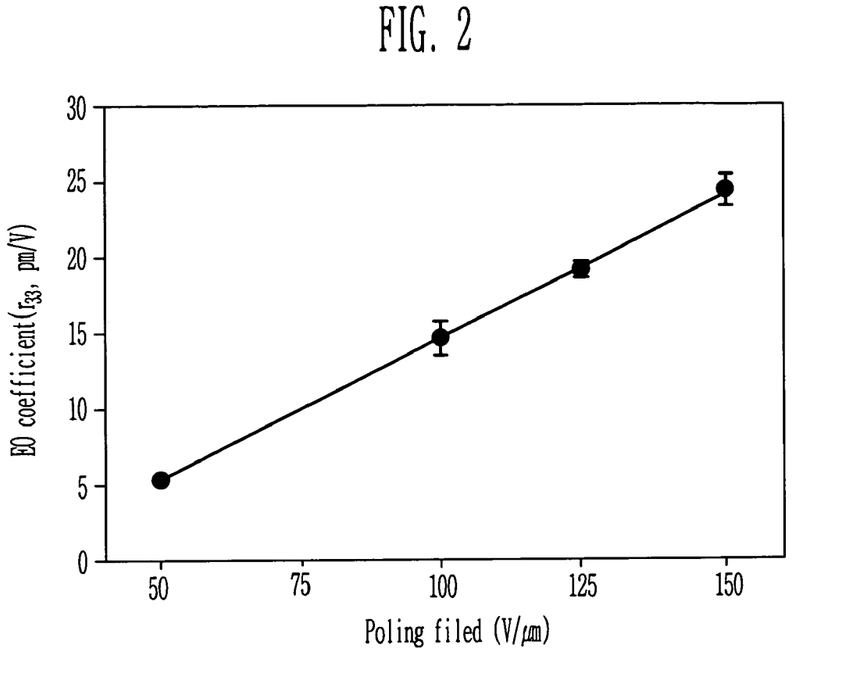
FIG. 2 is a graph illustrating change of an electro optic coefficient ($r_{33}$) of a polyamic ester, formed in the third embodiment according to the present invention, as a function of applied voltage.

As shown in FIG. 2, EO coefficients of the polyamic ester film poled with 50, 100, 125, 150 V/μm of the applied filed at 145° C. are 5.4, 14.6, 19.1, and 24.5 pm/V, respectively. The electric optical coefficients are almost linearly increasing with the increase of the electric field and has a maximum value of 24.5 pm/V with the electric field of 150V/μm. This value is at least twice larger than that of the side chain EO polymer containing DR1, for example, side chain EO polyimide and PMMA containing DR1. Therefore, the polyamic ester of the present invention is very advantageous as a side chain EO and NLO polymer over any other polymer main chains in terms of the improvement of the EO and NLO properties.

Figure 3:
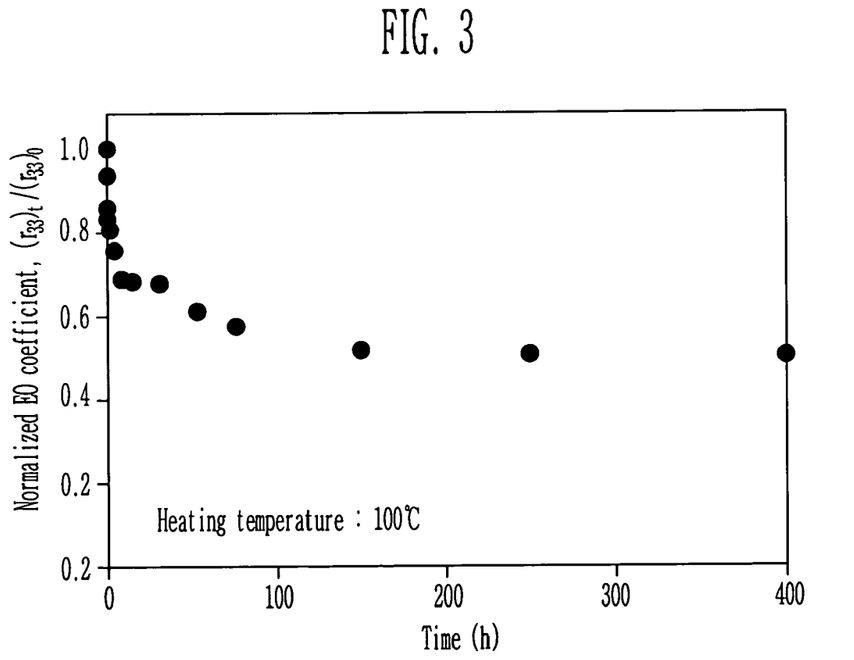
FIG. 3 is a graph illustrating the good thermal stability of $r_{33}$ polyamic ester formed in the third embodiment according to the present invention. The $r_{33}$ value obtained over time for the film stored at a high temperature was normalized to the initial $r_{33}$ value.

On the other hand, to identify the thermal stability of the EO effect, $r_{33}$ value obtained for the EO polyamic ester film stored at 100° C. according to time is normalized to the initial $r_{33}$ value and the result is shown in FIG. 3.

Referring to FIG. 3, it can be understood that the EO signal of the side chain polyamic ester according to the present invention is high thermal stability. Namely, it can be understood that the $r_{33}$ value is maintained to 50% at 100° C. for 400 hours, and moreover, the $r_{33}$ value is maintained to 85% or more of the initial value for a few minutes when the polymer is exposed to high temperature in a real optical device manufacturing process. Therefore, the electro optic coefficient of the side chain polyamic ester according to the present invention is not greatly decreased even though the polyamic ester is exposed to the temperature of 80 to 100° C. for a few minutes.

As described above, the side chain polyamic ester as EO and NLO polymers according to the present invention shows excellent electro optic and nonlinear optical properties and excellent thermal stability, so that it can be suitable for an electro optic and nonlinear optical device.

In addition, since the carboxyl acid group of the polyamic acid, as a precursor of polyimide, can be easily reacted with the hydroxyl group of the organic chromophore in the method of manufacturing the side chain polyamic ester as an EO and NLO polymer according to the present invention and the polyamic acid has two carboxylic acids per polymer repeating unit irrespective of the chemical structure of the monomers, it is advantageous that the side chain EO and NLO polymer can be synthesized without the limitation of the chemical structure of the monomers.

The present invention has been described with reference to a particular embodiment in connection with a particular application. Those having ordinary skill in the art and access to the teachings of the present invention will recognize additional modifications and applications within the scope thereof. It is therefore intended by the appended claims to cover any and all such applications, modifications, and embodiments within the scope of the present invention.

What is claimed is:

1. A polyamic ester comprising a repeating unit represented by the following chemical formula 1:

[Chemical Formula 1]

wherein ▬ denotes an aliphatic moiety or an aromatic moiety, ● denotes an aromatic moiety, and D is a residual group of an organic chromophore having electro optic (EO) or nonlinear optical (NLO) properties.

2. The polyamic ester as claimed in claim 1, wherein the D is a residual group of a .pi.-conjugated organic chromophore.

3. The polyamic ester as claimed in claim 2, wherein the D is a residual group having both an electron donating group and an electron accepting group.

4. The polyamic ester as claimed in claim 3, wherein the D is a residual of DR1 represented by the following chemical formula 2:

[Chemical Formula 2]

5. The polyamic ester as claimed in claim 4, wherein a glass transition temperature is in the range of from 150° C. to 200° C.

6. The polyamic ester as claimed in claim 5, wherein the polyamic ester is a 6F-ODPA DR1 polyamic ester represented by the following chemical formula 3:

[Chemical Formula 3]

7. An electro optic EO and NLO polymer film made by forming a polyamic in a film shape and poling the polyamic with an applied electric field at a high temperature; wherein the polyamic ester comprising a repeating unit represented by the following chemical formula 4:

[Chemical Formula 4]

wherein ▬ denotes an aliphatic moiety or an aromatic moiety, ● denotes an aromatic moiety, and D is a residual group of an organic chromophore having electro optic EO and NLO properties.

8. The electro optic EO and NLO polymer as claimed in claim 7, wherein the D is a residual group of a .pi.-conjugated organic chromophore.

9. The electro optic EO and NLO polymer as claimed in claim 8, wherein the D is a residual group having both an electron donating group and an electron accepting group.

10. The electro optic EO and NLO polymer as claimed in claim 9, wherein the D is a residual of DR 1 represented by the following chemical formula 5:

[Chemical Formula 5]

11. The electro optic EO and NLO polymer as claimed in claim 10, wherein a glass transition temperature is in the range of from 150° C. to 200° C.

12. The electro optic EO and NLO polymer as claimed in claim 11, wherein the polyamic ester is a 6F-ODPA DR1 polyamic ester represented by the following chemical formula 6:

[Chemical Formula 6]

13. The electro optic EO and NLO polymer as claimed in claim 7, the poling is performed at around glass transition temperature of the polyamic ester.

14. A method of manufacturing a polyamic ester, comprising steps of:
   i) preparing a polyamic acid by reacting a diamine monomer with an aromatic dianhydride; and
   ii) preparing the polyamic ester by reacting the polyamic acid with an organic chromophore, wherein the organic chromophore comprises a hydroxyl group and has electro optic EQ and NLO properties,
   wherein the polyamic ester comprising a repeating unit represented by the following chemical formula 7:

[Chemical Formula 7]

wherein ▬ denotes an aliphatic moiety or an aromatic moiety, ● denotes an aromatic moiety, and D is a residual group of an organic chromophore having electro optic EQ and NLO properties.

15. The method of manufacturing the polyamic ester as claimed in claim 14, wherein the D is a residual group of a .pi.-conjugated organic chromophore.

16. The method of manufacturing the polyamic ester as claimed in claim 15, wherein the D is a residual group having both an electron donating group and an electron accepting group.

17. The method of manufacturing the polyamic ester as claimed in claim 16, wherein the D is a residual of DR 1 represented by the following chemical formula 8:

[Chemical Formula 8]

18. he method of manufacturing the polyamic ester as claimed in claim 17, wherein a glass transition temperature is in the range of from 150° C. to 200° C.

19. The method of manufacturing the polyamic ester as claimed in claim 18, wherein the polyamic ester is a 6F-ODPA DR1 polyamic ester represented by the following chemical formula 9:

[Chemical Formula 9]

20. The method of manufacturing the polyamic ester as claimed in claim 14,
wherein the diamine is a 2,2-bis(4-aminophenyl) hexafluoropropane, wherein the dianhydride is a 4,4'-oxydiphthalic anhydride (ODPA), and
wherein the organic chromophore is a DR 1.

21. The method of manufacturing the polyamic ester as claimed in claim 20, wherein in the step of preparing the polyamic ester, a triphenyl phosphine and a diethyl azodicarboxylate are used as catalysts.

* * * * *